United States Patent Office 3,462,472
Patented Aug. 19, 1969

---

3,462,472
1,4- AND 1,2-BIS(SUBSTITUTED SULFONYLTHIO-METHYL)CYCLOHEXANE
Joseph E. Dunbar and Joan H. Rogers, Midland, Mich., assignors to The Dow Chemical Company, Midland, Mich., a corporation of Delaware
No Drawing. Filed June 1, 1967, Ser. No. 642,715
Int. Cl. C07c *143/24, 143/68, 149/44*
U.S. Cl. 260—453                    5 Claims

ABSTRACT OF THE DISCLOSURE

Cis- and trans- isomers of 1,2- and 1,4-bis-(substituted sulfonylthiomethyl)cyclohexanes corresponding to the formula

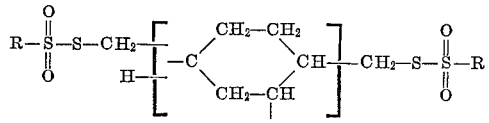

wherein R represents alkyl containing from 1 to 6 carbon atoms, phenyl, halophenyl, tolyl, and nitrophenyl. The compounds are useful as pesticides for the control of various bacteria, fungi and aquatic plants.

---

The present invention is directed to the cis- and trans-isomers of 1,2- and 1,4-bis(substituted sulfonylthiomethyl)cyclohexanes corresponding to the formula

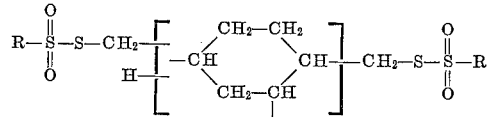

In the present specification and claims, R represents alkyl, phenyl, halophenyl, tolyl and nitrophenyl. The term "alkyl" as employed in the present specification and claims refers to alkyl moieties containing 1 to 6 carbon atoms, inclusive, and "halo" refers to bromine or chlorine. These compounds are crystalline solids at room temperature, somewhat soluble in many common organic solvents and of low solubility in water. The compounds are useful as pesticides for the control of various fungal and bacterial organisms such as *Phytophthera infestans*, citrus green mold, *Fusarium solani phaseoli*, *Verticillium alboatrum*, *Rhizoctonia solani*, fireblight, *Staphylococcus aureus*, *Trichophyton mentagrophytes*, *Streptomyces scabies*, rice blast, *Bacillus cereus*, *Cercosphora beticola* and *Pullularia pullulans*. The compounds wherein R represents alkyl are preferred embodiments of the present invention.

The novel cis- and trans- isomers of the 1,2- and 1,4-bis(substituted sulfonylthiomethyl)cyclohexane compounds of the present invention are prepared by reacting together an alkali metal salt of a thiosulfonic acid corresponding to the formula

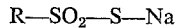

with a cis- or trans-1,2- or 1,4-bis(methylsulfonyloxymethyl)cyclohexane compound corresponding to the formula:

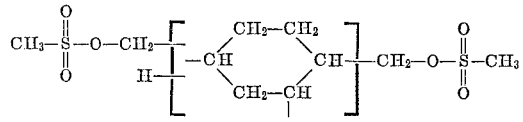

The reaction is conveniently carried out in an organic liquid as reaction medium. Representative organic liquids include dimethylformamide, acetonitrile, methanol, ethanol, isopropanol, acetone and aqueous acetone.
The amounts of the reactants to be employed in the reaction are not critical, some of the desired product being obtained when the reactants are employed in any proportions. In a preferred method of operation, good yields are obtained when employing one molecular proportion of the (methylsulfonyloxymethyl)cyclohexane with about 2 molecular proportions of the thiosulfonic acid alkali metal salt. The use of the thiosulfonic acid alkali metal salt in proportions materially greater than 2:1 with respect to the (methylsulfonyloxymethyl)cyclohexane starting material will not adversely affect the yield of desired product. Representative thiosulfonic acid alkali metal salts include potassium methanethiosulfonate, potassium propanethiosulfonate, sodium butanethiosulfonate, potassium p-nitrobenzenethiosulfonate, potassium m-bromobenzenethiosulfonate, sodium p-chlorobenzenethiosulfonate, sodium m-toluenethiosulfonate, and sodium o-chlorobenzenethiosulfonate.

The reaction takes place readily with the production of the desired product and the potassium or sodium methanesulfonate by-product at temperatures between 50° and 150° C. and preferably at temperatures between 60° and 100° C. The reaction mixture is generally maintained at the reaction temperature for from about 10 to 40 hours. In a convenient procedure, the temperature of the reaction mixture is maintained within the reaction temperature range until there is a substantial cessation in the precipitation of the sodium or potassium methanesulfonate.

In carrying out the reaction, the reactants are mixed and contacted together in any convenient fashion and the resulting mixture maintained for a period of time in the reaction temperature range to assure completion of reaction. During the reaction period, the potassium or sodium methanesulfonate by-product precipitates in the reaction mixture. Upon completion of the reaction period, the reaction mixture is processed by conventional procedures to obtain the desired product. In a convenient procedure, following the reaction period, the reaction mixture is cooled and filtered to remove the potassium methanesulfonate precipitate. When employing a water-misicible reaction medium, upon removal of the potassium methanesulfonate the filtered reaction mixture can be poured into ice water and the solid product which precipitates during the dilution procedure collected by decantation, filtration or centrifugation. When a water-immiscible solvent is employed as reaction mixture, the reaction mixture is cooled or concentrated following the removal of the potassium methanesulfonate to induce the crystallization of the product. The solid product obtained above is then further purified by conventional procedures such as washing or recrystallization.

The following examples are merely illustrative of the invention and are not to be construed as limiting.

Example 1

Trans - 1,2 - bis(methylsulfonyloxymethyl)cyclohexane (17.2 grams; 0.0572 mole) and potassium methanethiosulfonate (34.7 grams; 0.231 mole) were dispersed in 250 milliliters of dimethylformamide. The resulting reaction mixture was heated on the stream bath for 26 hours. Following the heating period, the reaction mixture was cooled and filtered to remove the potassium methanesulfonate by-product. The filtrate thus obtained was poured into water and the aqueous mixture filtered to remove a solid precipitate which formed therein. This solid precipitate was twice recrystallized from ethanol to give the trans-1,2-bis-(methylsulfonylthiomethyl)cyclohexane product melting at 111°–112.5° C. Elemental analysis showed this product to have carbon, hydrogen and sulfur contents of 36.35, 5.89 and 38.50 percent, respectively, as compared to the theoretical contents of 36.12, 6.06 and 38.57 percent, respectively.

Example 2

Trans - 1,4 - bis(methylsulfonyloxymethyl)cyclohexane (6.0 grams; 0.020 mole) and potassium methanethiosulfonate (12.0 grams; 0.08 mole) were dispersed in 200 milliliters of dimethylformamide. The resulting mixture was heated on a steam bath for fourteen hours and thereafter filtered to remove the potassium methanesulfonate byproduct and the filtrate thereafter poured into ice water. The aqueous mixture was then filtered to remove the crude product which had precipitated therein. This crude product was then recrystallized from acetonitrile to give the trans - 1,4 - bis(methylsulfonylthiomethyl)cyclohexane product melting at 165°–166° C. and having carbon, hydrogen and sulfur contents, as determined by elemental analysis, of 36.47, 5.82 and 38.85 percent, respectively, as compared to the theoretical contents of 36.12, 6.06 and 38.57 percent, respectively.

Example 3

Trans - 1,4 - bis(methylsulfonyloxymethyl)cyclohexane (5.0 grams; 0.0168 mole) and potassium p-toluenethiosulfonate (15.2 grams; 0.0672 mole) were dispersed in 200 milliliters of acetonitrile and the resulting reaction mixture heated at the boiling temperature and under reflux for 29 hours. Following the heating period the reaction mixture was filtered to remove the potassium methanesulfonate by-product which precipitated in the reaction mixture during the reaction period. The filtrate thus obtained was evaporated to dryness and the residue remaining was dissolved in methylene chloride. The methylene chloride solution was filtered to remove a small amount of insoluble material and then evaporated to dryness to obtain a crystalline residue which was then twice recrystallized from acetonitrile to give the trans-1,4-bis-(p-tolylsulfonylthiomethyl)cyclohexane product melting at 153.5°–155° C. and having carbon, hydrogen and sulfur contents as determined by elemental analysis of 54.54, 5.70, and 26.54 percent, respectively, as compared to the theoretical contents of 54.51, 5.82 and 26.46 percent, respectively.

The following compounds of the present invention are prepared in accordance with the aforegoing method.

Trans - 1,4 - bis(ethylsulfonylthiomethyl)cyclohexane, melting at 141°–143° C. was prepared by reacting together trans - 1,4-bis(methylsulfonyloxymethyl)cyclohexane and potassium ethanethiosulfonate.

Trans-1,4-bis(n - butylsulfonylthiomethyl)cyclohexane, melting at 91.5°–93.5° C. by reacting together trans-1,4-bis(methylsulfonyloxymethyl)cyclohexane and potassium n-butanethiosulfonate.

Cis-1,4-bis(p - nitrophenylsulfonylthiomethyl)cyclohexane (molecular weight 546.64) by reacting together cis-1,4-bis(methylsulfonyloxymethyl)cyclohexane and potassium p-nitrobenzenethiosulfonate.

Trans - 1,4 - bis(m - nitrophenylsulfonylthiomethyl)cyclohexane (molecular weight 546.64) by reacting together sodium m-nitrobenzenethiosulfonate and trans-1,4-bis(methylsulfonyloxymethyl)cyclohexane.

Cis - 1,2 - bis(n-hexylsulfonylthiomethyl)cyclohexane (molecular weight 472.76) by reacting together cis-1,2-bis(methylsulfonyloxymethyl)cyclohexane and sodium n-hexanethiosulfonate.

Cis - 1,4 - bis(p-tolylsulfonylthiomethyl)cyclohexane, melting at 113°–115.5° C., by reacting together cis-1,4-bis(methylsulfonyloxymethyl)cyclohexane and potassium p-toluenethiosulfonate.

Cis - 1,2 - bis(phenylsulfonylthiomethyl)cyclohexane (molecular weight 456.63) by reacting together cis-1,2-bis(methylsulfonyloxymethyl)cyclohexane and sodium benzenethiosulfonate.

Trans - 1,4-bis(2,4-dichlorophenylsulfonylthiomethyl)cyclohexane (molecular weight 594.43) by reacting together trans - 1,4 - bis(methylsulfonyloxymethyl)cyclohexane and potassium 2,4-dichlorobenzenethiosulfonate.

Cis - 1,4 - bis(methylsulfonylthiomethyl)cyclohexane, melting at 74°–75.5° C., by reacting together cis-1,4-bis(methylsulfonyloxymethyl)cyclohexane and potassium methanethiosulfonate.

Cis - 1,4 - bis(ethylsulfonylthiomethyl)cyclohexane (melting at 71°–72.5° C.) by reacting together cis-1,4-bis(methylsulfonyloxymethyl)cyclohexane and potassium ethanethiosulfonate.

The compounds of the present invention are useful as pesticides for the control of a number of pests such as bacteria, fungi and aquatic plants such as cabomba, moneywort and salvinia. For such uses the product may be dispersed on an inert finely divided solid and employed as dusts. The compounds may also be dispersed in water with or without the aid of a surface active agent and the resulting aqueous suspensions employed as sprays. In other procedures, the products are employed as the active constituents in solvent solutions, oil-in-water or water-in-oil emulsions, or aqueous dispersions. In representative operations, cis-1,4-bis(methylsulfonylthiomethyl)cyclohexane, trans - 1,4-bis(n-butylsulfonylthiomethyl)cyclohexane, trans - 1,2-bis(methylsulfonylthiomethyl)cyclohexane and cis - 1,4 - bis(ethylsulfonylthiomethyl)cyclohexane, each, when employed as the sole toxic constituent in aqueous compositions at a concentration of 150 parts per million give 90 to 100 percent kill of potato late blight. In other operations, cis - 1,4 - bis (ethylsulfonylthiomethyl)cyclohexane when employed as the sole toxic constituent in aqueous compositions and at a concentration of 100 parts per million gave complete control of citrus green mold, bean root rot, *Rhizoctonia solani*, fire blight, *Staphylococcus aureus* and *Trichophyton mentagrophytes*, when a drop of the aqueous composition was applied to the growing organisms.

We claim:

1. A compound corresponding to the formula

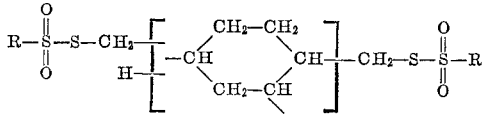

wherein R represents a 1 to 6 carbon alkyl, phenyl, monochlorophenyl, monobromophenyl, dichlorophenyl, dibromophenyl, tolyl, and mononitrophenyl.

2. The compound claimed in claim 1 wherein the compound is trans - 1,4-bis(methylsulfonylthiomethyl) cyclohexane.

3. The compound claimed in claim 1 wherein the compound is trans - 1,2 - bis(methylsulfonylthiomethyl) cyclohexane.

4. The compound claimed in claim 1 wherein the compound is cis - 1,4-bis(ethylsulfonylthiomethyl)cyclohexane.

5. The compound claimed in claim 1 wherein the compound is cis - 1,4 - bis(methylsulfonylthiomethyl)cyclohexane.

References Cited

UNITED STATES PATENTS

| | | | |
|---|---|---|---|
| 2,678,878 | 5/1954 | Stewart. | |
| 3,282,976 | 11/1966 | Dunbar | 260—453 |
| 3,284,481 | 11/1966 | Dunbar | 260—453 |
| 3,338,945 | 8/1967 | Dunbar | 260—453 |

CHARLES B. PARKER, Primary Examiner

S. T. LAWRENCE III, Assistant Examiner

U.S. Cl. X.R.

71—66, 103; 260—456; 424—303